US008646054B1

(12) United States Patent
Karr et al.

(10) Patent No.: US 8,646,054 B1
(45) Date of Patent: Feb. 4, 2014

(54) MECHANISM TO MANAGE ACCESS TO USER DATA AREA WITH BRIDGED DIRECT-ATTACHED STORAGE DEVICES

(75) Inventors: Christopher P. Karr, Lake Forest, CA (US); John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/429,094

(22) Filed: Mar. 23, 2012

(51) Int. Cl.
*G06F 7/04* (2006.01)

(52) U.S. Cl.
USPC .......... 726/5; 726/24; 726/2; 726/23; 726/26; 713/193; 455/41.1; 380/281

(58) Field of Classification Search
USPC ........ 726/2–5, 16, 23, 26; 713/153–155, 193, 713/183, 2; 711/110
See application file for complete search history.

(56) References Cited

U.S. PATENT DOCUMENTS

| 7,456,634 | B2 | 11/2008 | Knott |
| 7,702,830 | B2 | 4/2010 | Brunet et al. |
| 7,721,115 | B2 * | 5/2010 | Luttmann et al. ............. 713/193 |
| 7,748,031 | B2 * | 6/2010 | Gonzalez et al. ................. 726/9 |
| 7,780,079 | B2 * | 8/2010 | Merzlikine et al. ........... 235/382 |
| 7,813,913 | B2 | 10/2010 | Collins et al. |
| 7,818,160 | B2 | 10/2010 | Collins et al. |
| 7,822,595 | B2 | 10/2010 | Brunet et al. |
| 7,843,907 | B1 | 11/2010 | Abou-Emara et al. |
| 7,844,445 | B2 | 11/2010 | Brunet et al. |
| 7,899,186 | B2 | 3/2011 | Thibadeau |
| 7,899,662 | B2 | 3/2011 | Brunet et al. |
| 7,925,894 | B2 | 4/2011 | Thibadeau |
| 8,050,905 | B2 | 11/2011 | Brunet |
| 8,069,271 | B2 | 11/2011 | Brunet et al. |
| 8,220,039 | B2 * | 7/2012 | Gonzalez et al. ................. 726/9 |
| 8,315,394 | B2 * | 11/2012 | Sanvido et al. ............... 380/281 |
| 8,316,237 | B1 * | 11/2012 | Felsher et al. ................ 713/171 |
| 8,413,242 | B2 * | 4/2013 | Ejiri et al. ........................ 726/23 |
| 8,533,854 | B2 * | 9/2013 | Ginter et al. ..................... 726/27 |
| 2006/0184806 | A1 * | 8/2006 | Luttmann et al. ............. 713/193 |
| 2010/0031349 | A1 * | 2/2010 | Bingham ........................ 726/20 |
| 2010/0257377 | A1 * | 10/2010 | Ejiri et al. ..................... 713/193 |
| 2010/0333192 | A1 * | 12/2010 | Song ............................... 726/16 |
| 2011/0026817 | A1 * | 2/2011 | Edge ............................. 382/165 |
| 2011/0087889 | A1 * | 4/2011 | Iyer et al. ...................... 713/182 |
| 2011/0154023 | A1 * | 6/2011 | Smith et al. .................... 713/155 |
| 2013/0061287 | A1 * | 3/2013 | Kang et al. ........................ 726/3 |

OTHER PUBLICATIONS

Daniel Edge, "SecuTok"—Secure removable media, Mar. 2006, IEEE, vol. 11 , pp. 1-8.*

* cited by examiner

*Primary Examiner* — Nathan Flynn
*Assistant Examiner* — Viral Lakhia

(57) ABSTRACT

The present invention provides a bridged, direct-attached storage device that can be secured and work with any host system. In one embodiment, the storage device is configured with a secured user area and an unlocking mechanism for access to the secured user area. The storage device may comprise a translation module having a bridge that presents multiple logical units to a host. In addition, the storage device may comprise a controller having its own encryption engine to encrypt the entire user area of the storage media. In one embodiment, the storage device presents the unlocking mechanism via a second logical device as a read-only device, such as a CD/DVD-ROM, or virtual CD device. The secondary logical device comprises executable code, which allows the user, for example, to enter, change, or remove the password and unlock the user area.

20 Claims, 5 Drawing Sheets

MECHANISM TO MANAGE ACCESS TO USER DATA AREA WITH BRIDGED DIRECT-ATTACHED STORAGE DEVICES

BACKGROUND

Today, portable data storage devices are capable of storing large amounts of data. Portable data storage devices, however, can be a major security concern because they can be attached to numerous hosts or subjected to attack. Accordingly, many organizations now require portable storage devices to have one or more security features.

For example, the Advanced Technology Attachment ("ATA") specification provides a mechanism for setting a password on a storage device. An ATA password, also known as the ATA Security Feature Set, is part of the ATA specification. By setting an ATA password, the drive limits access to its data and accepts only a limited number of commands. A host cannot read or write to the storage device until it is authenticated. In addition, the drive may employ encryption, such as full disk encryption, to prevent access to the data without a password.

Typically, when booting or accessing a protected drive, the user at a host must execute a third party management application to enter the appropriate password and manage the storage device encryption. Unfortunately, this approach requires the installation and use of a separate application to access the storage device. The storage device is thus limited to only those hosts having this third party application installed.

Without the software application, the host is unable to authenticate with the drive and a functional deadlock results because there is no way for the host to send commands to the drive to unlock the user area. For example, if the user connects the drive to a new or different host, then this host cannot authenticate with the drive because it lacks the third party software.

Accordingly, it would be desirable to provide a secure, portable storage device that is self sufficient.

BRIEF DESCRIPTION OF THE DRAWINGS

Systems and methods which embody the various features of the invention will now be described with reference to the following drawings, in which.

DETAILED DESCRIPTION

A self-sufficient security mechanism for a portable data storage device is provided, such that the storage device can work with any number of hosts without requiring specific software to be installed on any of these hosts. In one embodiment, the portable storage device is a bridged, direct-attached storage device configured to present multiple logical units. One of the logical units provides an unlocking mechanism, for example, for allowing a host to authenticate. Another logical unit provides access to the user area of the storage device based on the host authentication.

The unlocking mechanism may be mapped to a reserved or non-user area of the storage medium. This second logical device may emulate a secondary, tertiary, etc., storage device. In one embodiment, the second logical device or unit emulates a read-only storage device, such as a CD/DVD-ROM or virtual CD ("VCD") device.

The unlocking mechanism may comprise one or more sets of program code that are executable by a variety of hosts. When executed, the unlocking mechanism may provide an interface for a user to enter a password or other type of authentication. The host may authenticate with the first logical device by presenting this password and unlock the user area. The unlocking mechanism may be compatible with any host platform, such as Mac OS, Windows, Linux, etc.

After executing the unlocking mechanism, the storage device may present its user are via another logical unit. In one embodiment, the user area may be secured based on an ATA password. In addition, the user area may be encrypted. An encryption engine in the bridge may perform the cryptographic operations for the user area. In another embodiment, the storage device may comprise it's own encryption engine for performing cryptographic engines for data in the user area.

Reference will now be made to the figures to illustrate various aspects and embodiments of the present invention. In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
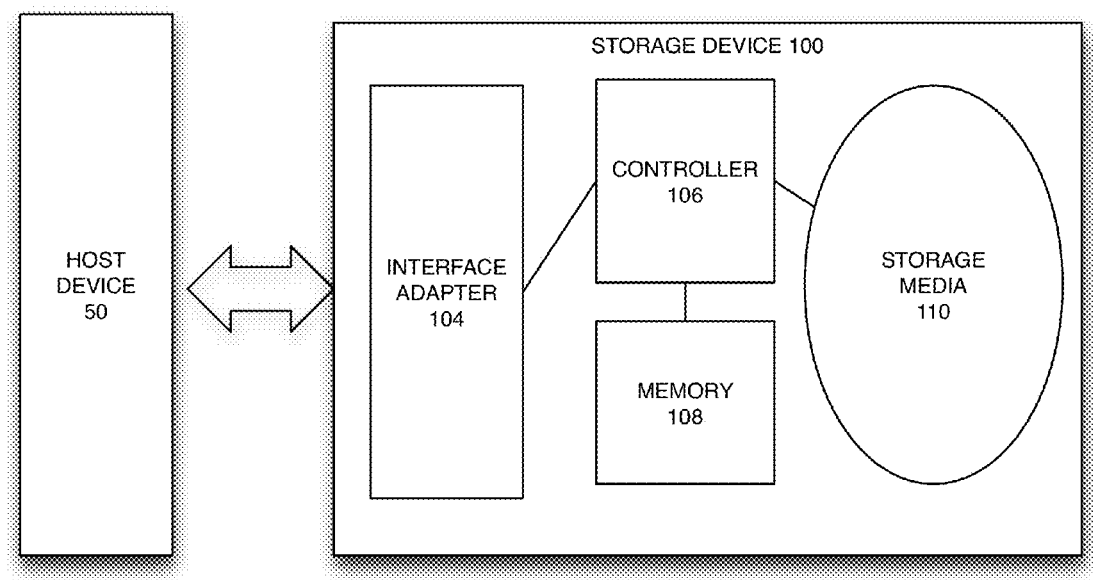
FIG. 1 shows an exemplary system for one embodiment of the present invention.

FIG. 1 shows an exemplary system for one embodiment of the present invention. As shown, the system may comprise a host device 50 coupled to a storage device 100. In one embodiment, the storage device 100 is implemented as a bridged, direct-attached device. As such, the storage device 100 may be connected to a variety of host devices including host device 50.

The host device 50 refers to any computer or device that is used by a user. For example, the host device 50 may be a personal computer, a laptop computer, a mobile device, a smartphone, etc. Such devices are known to those skilled in the art.

The host device 50 may run based on an operating system, such as Mac OS, Windows, Linux, Unix, Android, etc. The host device 50 may further comprise a host adapter (not shown) to connect to the storage device 100. In the embodiments, the host device 50 may connect to the storage device 100 via a protocol, such as small computer system interface ("SCSI"), integrated drive electronics ("IDE"), Ethernet, FireWire, universal serial bus ("USB"), external serial ATA ("eSATA"), etc.

The storage device 100 may comprise an interface adapter 104, a controller 106, a memory 108, and a storage media 110. The storage device 100 refers to any device storing and providing access stored on its storage media 110. The storage device 100 may comprise any number of hard disk drives, flash storage drives, or hybrid drives. As shown, the storage device 100 may be coupled to the host device 50. The connection may be any of the known protocols, such as USB, Ethernet, FireWire, IDE, eSATA, SCSI, etc.

In one embodiment, the storage device 100 may be secured based on an ATA password. For example, the ATA password may be configured based on an ATA Set Password Command. The password for the storage device 100 may be set at various times.

In addition, the storage device 100 may encrypt the user area of the storage media 110. In one embodiment, the controller 106 comprises its own encryption engine to encrypt the user area.

Interface adapter 104 performs the various translations that converts communications from the host device 102 into commands or communications that can be processed by the controller 106. In one embodiment, the interface adapter 104 is configured to present multiple logical units. One of the logical units provides an unlocking mechanism for authenticating host device 50. Another of the logical units presents the user area of the storage media 110. Such features by the storage device 100 are further described below.

Controller 106 performs various operations of the storage device 100 described herein. The controller 106 may be implemented using one or more processors for executing instructions. Such hardware, firmware, and software for implementing the controller 106 are known to those skilled in the art. For example, the controller 106 may comprise, among other things, a microcontroller, a Digital Signal Processor (DSP), an Application Specific Integrated Circuit (ASIC), a Field Programmable Gate Array (FPGA), hard-wired logic, analog circuitry, and/or a combination thereof.

Memory 108 provides a memory for data and information being processed by the controller 106. The memory 108 may comprise volatile or non-volatile memory. The memory 108, for example, can comprise a dynamic random access memory ("DRAM"), a flash memory, or a static random access memory ("SRAM"). The memory 108 may further comprise a cache for temporarily storing write data received from the host device 102 and read data requested by the host device 102.

Storage media 110 comprises the physical material and media that holds the data stored by the storage device 100. For example, the storage media 110 may comprise a magnetic media, an optical media, a semiconductor media, such as a flash memory, and the like.

Figure 2:
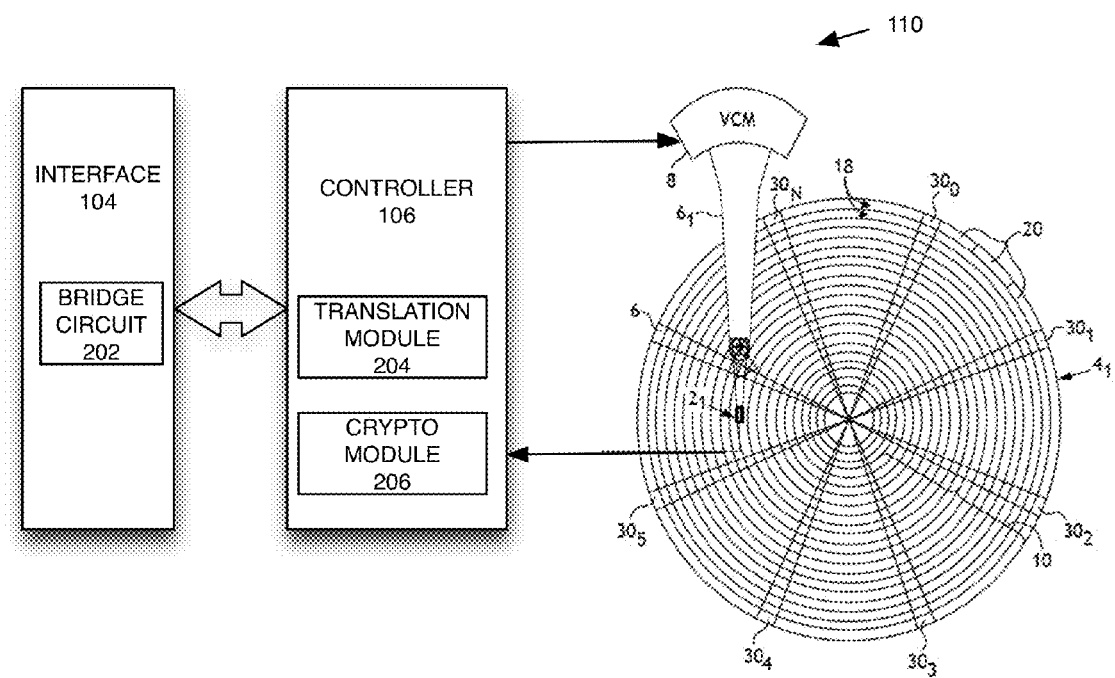
FIG. 2 shows further information of an exemplary storage device.

FIG. 2 shows an exemplary storage device 100 implemented as a hard disk drive. As a hard disk drive, the controller 106 employs a voice coil motor ("VCM") 8 having a head $2_1$ to read and write data to the storage media 110. As shown, the storage media 110 comprises a storage area 10 divided into a number of radially spaced, concentric tracks 18. Each track 18 may be divided into a number of sectors 20 that are spaced circumferentially along the track 18. The sectors 20 may be used to store user data and/or other information. The storage media 110 may also comprise a plurality of angularly spaced servo wedges $30_0$-$30_N$, each of which may include embedded servo information that can be read from the storage media 110 by the head $2_1$ to determine the position of the head $2_1$ over the storage media 110. For example, each servo wedge $30_0$-$30_N$ may include a pattern of alternating magnetic transitions (e.g., a servo burst), which may be read from the storage media 110 by the head $2_1$ and processed by the controller 106 to estimate the position of the head $2_1$ relative to the storage media 110. The angular spacing between the servo wedges $30_0$-$30_N$ may be uniform, as shown in the example in FIG. 2.

To write data to the storage media 110, the controller 106 may first position the head $2_1$ at a desired track 18 on the storage media 110 by sending a control signal input (e.g., a control current) to the VCM 8. The controller 106 may include a servo control system that positions an arm $6_1$ and a head $2_1$ using the VCM 8 based on position information read from one or more servo wedges $30_0$-$30_N$. The controller 106 processes data to be written to the storage media 110 into a write signal, which is outputted to the head $2_1$. The head $2_1$ converts the write signal into a magnetic field that magnetizes the surface of the storage media 110 based on the write signal, thereby magnetically writing the data to the storage media 110.

To read data from the storage media 110, the controller 106 positions the head $2_1$ at a desired track 18 on the storage media 110. The head $2_1$ generates a read signal based on the magnetization of the disk surface under the head $2_1$. The controller 106 receives and processes the read signal into data, thereby reading the data from the storage media 110.

The controller 106 may write data to and read data from the storage media 110 in response to write/read commands from the host device 50. When the controller 106 receives a host write command including data to be written to the storage media 110, the controller 106 may temporarily hold the data from the host 50 in a buffer (e.g., memory 108) and write the data from the memory 108 to the storage media 110 using the head $2_1$. When the controller 106 receives a host read command requesting data stored on the storage media 110, the controller 106 may read the requested data from the storage media 110, temporarily hold the read data in the memory 108 and send the read data from the buffer to the host.

In one embodiment, the host 50 may address data in a user area of the storage media 110 based on write/read commands using logical block addresses (LBAs), in which each LBA addresses a block of data. The controller 106 may maintain a mapping table (not shown) mapping the LBAs from the host to physical block addresses ("PBAs") of the corresponding data on the storage media 110. Each PBA may address a sector on the storage media 110. When the controller 106 receives a host read command, the controller 106 uses the mapping table to map the LBAs in the read command to the PBAs of the requested data on the storage media 110. The use of LBAs allows the host 50 to address data stored in the disk drive 100 without having to know the physical locations of the data on the storage media 110. In one embodiment, the controller 106 may employ a dynamic LBA mapping scheme in which incoming data from the host is written to sequential tracks of the storage media 110 regardless of the order of the LBAs of the data.

As the controller 106 writes data from the host to sectors on the storage media 110, the controller 106 may update the mapping table to map the LBAs of the data to the PBAs of the sectors on the storage media 110. This allows the controller 106 to later locate the data on the storage media 110 when the controller 106 receives a read command from the host requesting data at the corresponding LBAs. The controller 106 may temporarily store the mapping table in a buffer (e.g., DRAM) and update the mapping table in the buffer as the controller 106 writes data to the storage media 110. The controller 106 may subsequently write the updated mapping table to the storage media 110 within an area of the storage media 110 reserved for the mapping table. However, if the controller 106 does not write the updated mapping table to the storage media 110 (e.g., due to a power loss in the disk drive 100), then the controller 106 may lose the updates to the mapping table.

In one embodiment, as the controller 106 writes data to the storage media 110, the controller 106 may also write metadata files to the storage media 110. Each metadata file may include PBA to LBA mapping information for data in one or more tracks and/or sectors of the storage media 110. In this embodiment, if the disk drive 100 loses power before the updated mapping table in the buffer can be written to the storage media 110, then, on the next power cycle, the controller 106 can read the metadata files from the storage media 110 and use the read metadata files to reconstruct the updated mapping table, as discussed further below.

As also shown in FIG. 2, the interface 104 may comprise a bridge circuit 202 and the controller 106 may comprise a translation module 204 and a cryptographic module 206. These components will now be further described below.

Bridge circuit 202 comprises circuitry that translates communications between the host device 50 and the controller 106. For example, in one embodiment, the bridge circuit 202 translates the external interface communications, such as a USB, Firewire, eSATA, into a drive interface communications for storage device 100, such as IDE or SATA. Bridge circuit 202 may be implemented as a chipset and/or system-on-chip. For example, the bridge circuit 202 may comprise, among other things, a microcontroller, an Application Specific Integrated Circuit (ASIC), a Field Programmable Gate Array (FPGA), hard-wired logic, analog circuitry, and/or a combination thereof. In one embodiment, the bridge circuit 202 may comprise an encryption engine (not shown) that is used to encrypt data stored in the user area of the storage medium 110.

Referring now to various aspects of the controller 106, a translation module 204 may comprise the hardware, firmware, and software for translating commands received from the interface 104 into drive commands for accessing and writing data on the storage medium 110. In one embodiment, the translation module 204 provides multiple logical units for accessing the storage medium 110. In this embodiment, the translation module 204 allocates a certain portion of the storage medium 110 to a first logical device/unit and another portion of the storage medium 110 to a second logical device/unit.

As noted, controller 106 may comprise an encryption capability, such as cryptographic module 206, rather than relying on encryption processing by the bridge circuit 202. In the prior art, the bridge circuit 202 normally performed drive encryption services. By incorporating an installed encryption module in the controller 106, one embodiment allows the storage device 100 to use bridge circuits that lack encryption circuitry. This feature has several advantages.

For example, the storage device 100 may employ a simpler or cheaper bridge circuit, because an encryption engine is not needed in the bridge circuitry. Bridge firmware complexity and code space is reduced. Furthermore, the bridge circuit 202 power consumption is reduced, for example as much as a 20% power savings, as a result of removal or disabling of this encryption.

As another advantage, the inclusion of the cryptographic module 206 in the controller 106 may optimize performance for encrypted RAID systems because only one encryption engine per storage device 100 is used. As yet another advantage, the controller 106 having cryptographic module 206 allows for common encryption implementation regardless of individual bridge circuit components that are used.

Cryptographic module 206 in the controller 106 may comprise hardware, firmware, and software to perform various cryptographic functions. In one embodiment, the cryptographic module 206 is implemented as a chipset or system-on-chip having various security measures to make it secure from tampering. The cryptographic module 206 may or may not be isolated from other components of the controller 106. In one embodiment, the cryptographic module 206 supports drive encryption for ATA security.

Figure 3:
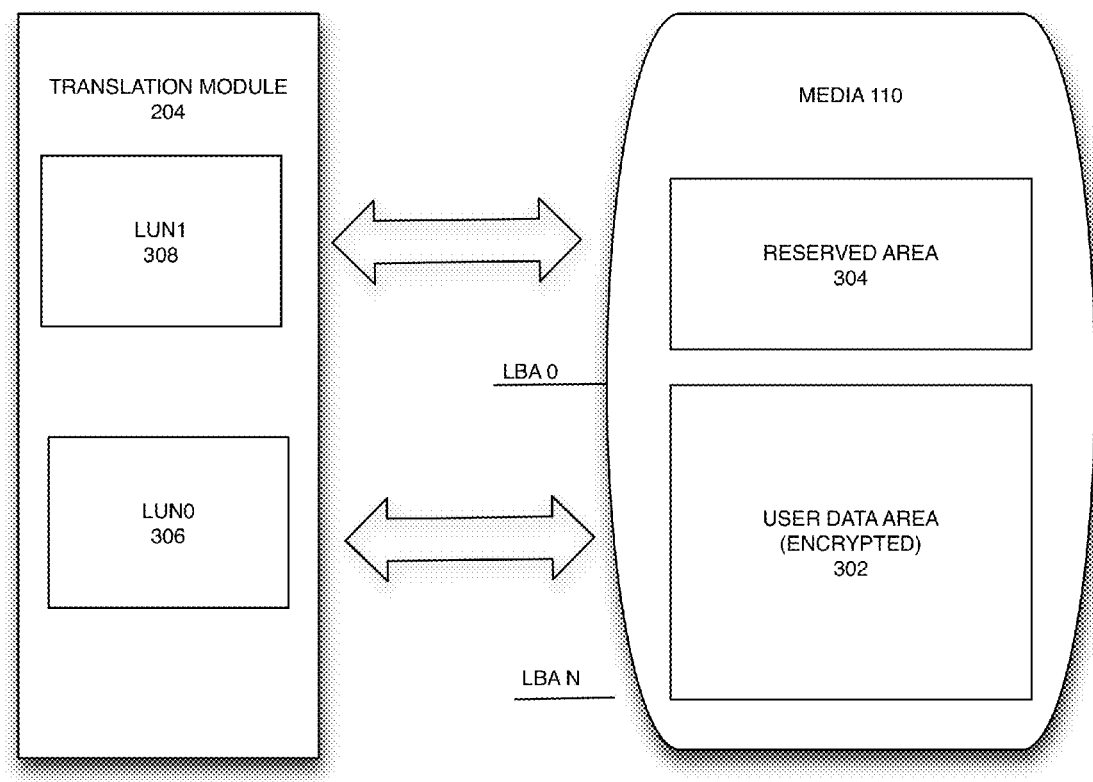
FIG. 3 shows an exemplary translation module of a storage device.

FIG. 3 conceptually illustrates an embodiment of the present invention. As shown, the storage media 110 may comprise a user area portion 302 and a non-user area portion 304. In one embodiment, the user area 302 comprises the portion of storage media 110 that is addressable by LBAs, such as LBAs 0-N. The non-user area 304 may refer to any portion of the storage media 110 that is not addressable by LBAs or has been otherwise reserved by the storage device 100.

In this embodiment, the translation module 204 is configured to provide multiple logical units 306 and 308 for accessing the storage medium 110. As shown, the translation module 204 maps the user area 302 to a first logical device/unit ("LUN0") 306 and the non-user area 304 to the second logical device/unit ("LUN1") 308.

The first logical device 306 is configured to provide access to the user area 302. For example, as shown, the first logical device 306 is a SATA-compliant device that provides access to the LBA-addressable area of the user area 302. In addition, as shown, the first logical device 306 is ATA password-protected and data stored by this logical device is encrypted. In one embodiment, the cryptographic module 206 in controller 106 encrypts the data stored by the first logical device 306. Alternatively, in another embodiment, an encryption engine in the bridge circuit 202 may encrypt the data stored in the user area 302.

The second logical device 308 may be configured to emulate an independent storage device and provides access to the reserved or non-user area 304. In one embodiment, the non-user area 304 is not addressable by the host system 50 with LBA addressing. In one embodiment, the non-user area 304 is only accessible by the second logical device 308. For example, the second logical device 308 may be configured as a read-only device, such as a CD/DVD-ROM device or virtual CD ("VCD") device. In one embodiment, the second logical device 308 may employ proprietary commands to access the non-user area 304.

In one embodiment, the second logical device 308 provides an unlocking mechanism or application as executable code in the reserved area 304. The unlocking mechanism allows a user of host system 50 to enter a password, such as the ATA password needed to access the user area 302. In another embodiment, the unlocking mechanism allows the user to recover or reset access to the storage device 100. For example, the second logical device 308 may employ an ATA log command to access the non-user area 304. Responsive to this command, the second logical device 308 may provide one or more sets of executable program code that are automatically run by the host 50. For example, the host 50 may provide a user interface that allows the user to enter the password and unlock the user area 302 of storage medium 110 for host 50. In one embodiment, the second logical device 308 is configured to emulate a read-only device, such as a CD, VCD, DVD, and the like.

In another embodiment, the second logical device 308 may provide executable program code for recovering from a lost or forgotten ATA password. The executable program code may provide various tools. For example, the executable program code may emulate a boot disk having file system drivers and software that is capable of reading the registry in the host 50 and rewrite the password hashes to regain access to the storage device 100. As another example, the executable program code provided by the second logical device 308 may be a startup utility that allows the user to reset a user, administrative, or master password. The program code may support a variety of drive types, such as SCSI, SATA, and RAID. Accordingly, once the password has been reset, the user may then reboot the host 50 and access the storage device 100 using the new password.

Figure 4:
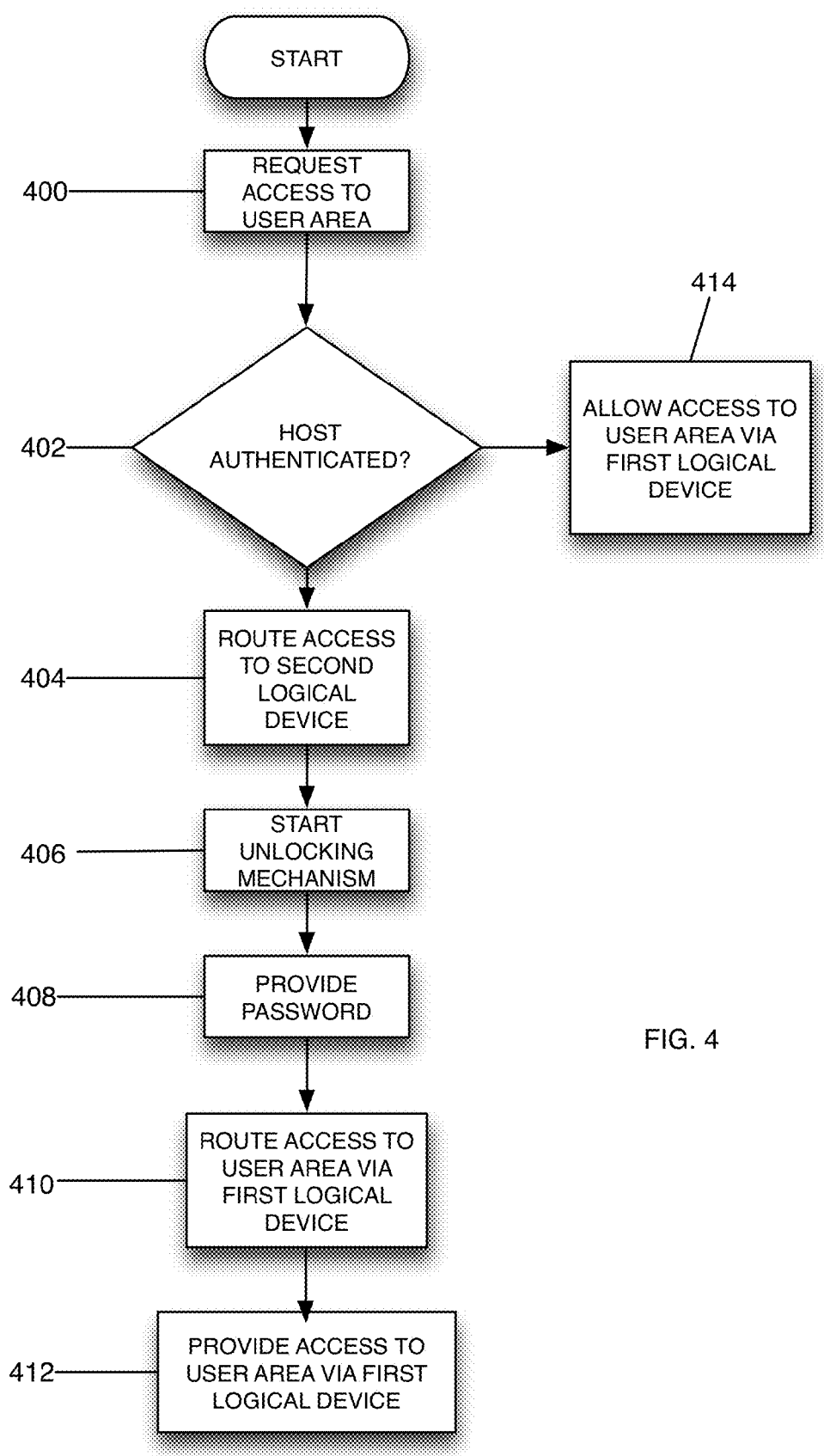
FIG. 4 shows an exemplary process flow for one embodiment of the present invention.

FIG. 4 shows an exemplary self-sufficient process flow for unlocking the storage device according to one embodiment.

In phase 400, the host system 50 requests access to the storage device 100. For example, the host system 50 may request access in response to being connected to the storage device 100, starting up, or based on data requested by an application running on the host system 50. In one embodiment, the storage device 100 is protected based on an ATA password, which must be presented by the host system 50.

In phase 402, the controller 106 senses the access request by the host system 50 and determines if the access request includes the required authentication information, such as an ATA password. If the access request includes authentication information (i.e., the host system 50 can authenticate itself), then processing flows to phase 414 where translation module 204 may route the communications from the host system 50 to the user area 302 via the first logical device 306.

In phase 404, the controller 106 has determined the access request lacks authentication information, and thus, initiates an unlocking mechanism via the second logical device 308. For example, the translation module 204 may route communication from the host system 50 to the second logical device 308. As noted, the second logical device 308 is configured to emulate a read-only device, which may commence an auto-run sequence when started. In one embodiment, the second logical device 308 is a VCD stored in non-user, reserved area 304. The translation module 204 may access the reserved area 304 based on an ATA log command that is proprietary to translation module 204.

In phase 406, the host 50 installs and/or executes program code for an unlocking mechanism provided by the second logical device 308. In one embodiment, the executable program code may run on the host system 50 as a utility having a user interface that allows the user to enter a password.

In phase 408, once the user enters a password at host 50, the unlocking mechanism running on the host system 50 may then request access to the user area 302 and present the password. For example, the host system 50 may now send an ATA security feature command to the storage device 100 with the password entered by the user. The controller 106 may detect this command and confirm that the host system 50 is now presenting an ATA password and authenticate the host 50. For example, translation module 204 will now route the command to the first logical device 306.

In phase 410, the host system 50 accesses the user area 302 via the first logical device 306 based on the password entered by the user. For example, the controller 106 may check the password presented by the host system 50 with data stored in the user area 302. In addition, the controller 106 may utilize its cryptographic module 206 to encrypt/decrypt the data stored in the user area 302.

In phase 412, the host system 50 has been authenticated and the first logical unit 306 unlocks the user area 302. Accordingly, the host system 50 may continue with normal read and write operations with the storage system 100. As noted, in one embodiment, the translation module 204 may employ its cryptographic module 206 to encrypt/decrypt the data to and from the user area 302 of the data storage media 110.

Figure 5:
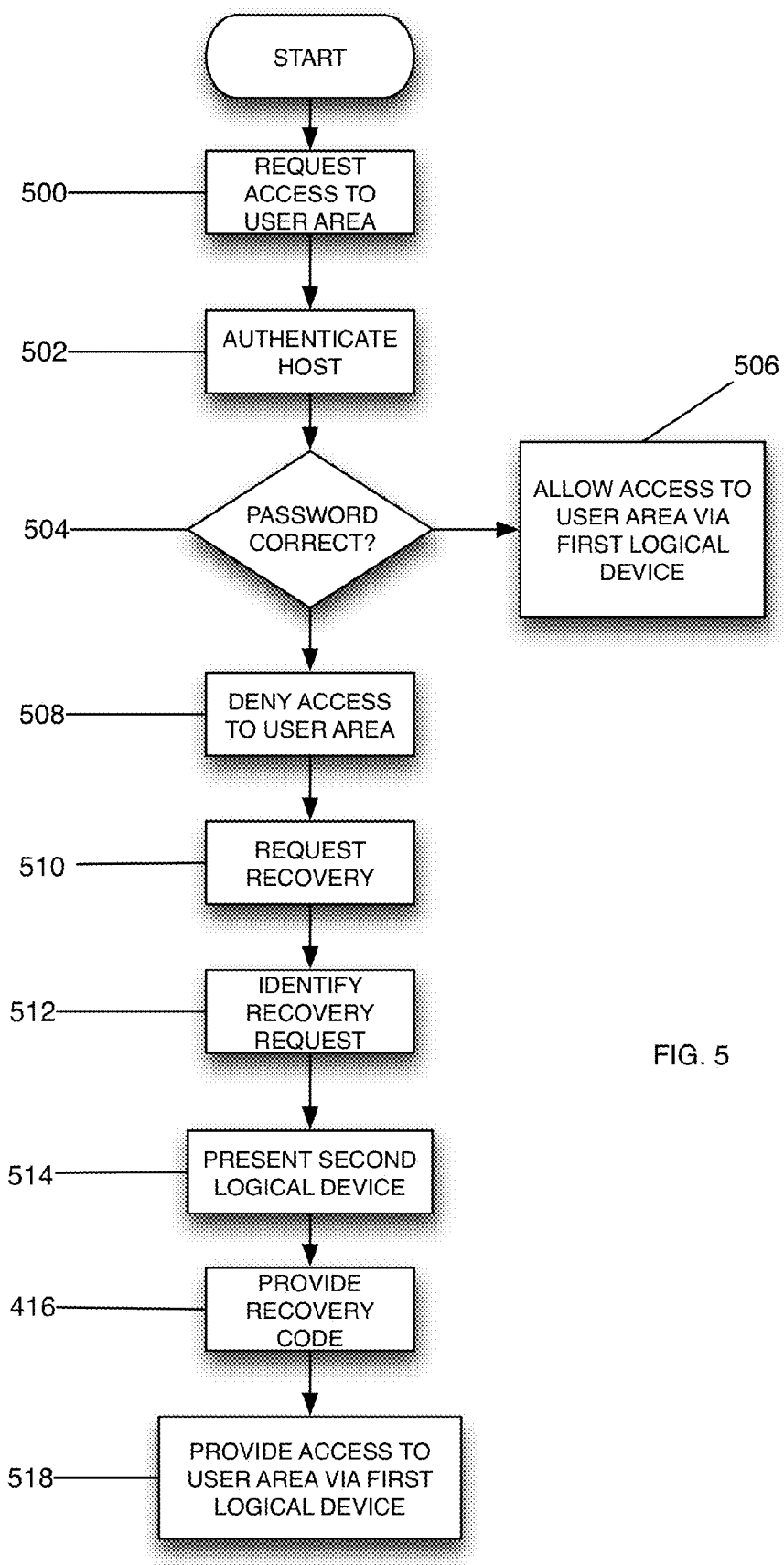
FIG. 5 shows an exemplary process flow for another embodiment of the present invention.

FIG. 5 shows an exemplary process flow for recovering accessing to the storage device. In phase 500, the host system 50 requests access to the storage device 100. For example, the host system 50 may request access in response to starting up or based on data requested by an application running on the host system 50. As noted, the host system 50 may request access to information using LBAs.

In phase 502, the storage device 100 authenticates the host device 50. For example, the storage device 100 may be configured with an ATA security feature set and require an ATA password. In addition, the data stored in the user area 302 may be encrypted and rendered unreadable unless a correct password is presented by the host system 50. A user of the host system 50, at startup or when access is requested, may enter the ATA password.

In phase 504, the storage device 100 checks the password provided from the host system 50 and determines whether to approve the authentication attempt by the host system 50. Of note, the host system 50 may also perform password checking independently or with the storage device 100. If the password is correct, then in phase 506, the controller 106 provides access to the user area 302 via the first logical device 306.

If the password is incorrect, then in phase 508, the controller 106 denies access to the user area 302. In one embodiment, the host system 50 may indicate an authentication failure via a message to the user.

In phase 510, in response to an authentication failure, the host system 50 may request a recovery. In one embodiment, the host system 50 may require the user to provide information, such as a user identifier, password, and the like. The host system 50 may then verify this information before proceeding with a recovery request. In one embodiment, the host system 50 provides the recovery request using a specific command.

In phase 512, the controller 106 identifies the recovery request. In particular, the translation module 204 in the controller 106 may identify the recovery request and employ various ATA commands to access recovery program code. For example, the translation module 204 may route the recovery request to the second logical device 308. In turn, the second logical device 308 may utilize an ATA log command to access reserved area 304.

In phase 514, the second logical device 308 presents the reserved area 304 as a separate or independent storage device. For example, in one embodiment, the second logical device 308 presents itself as a read-only storage device, such as a CD, DVD, or VCD.

In phase 516, the second logical device 308 provides executable program code from the reserved area 304 to the host device 50 for recovering access to the user area 302. In one embodiment, the executable program code from reserved area 304 emulates a boot disk having file system drivers and software that is capable of reading the registry in the host 50 and rewrite the password hashes in the registry. In another embodiment, the executable program code from the reserved area 304 may be installed in the host system 50 as a startup utility that allows the user to reset a user, administrative, or master password.

In phase 518, once the password has been reset or recovered, the user at host system 50 may regain access to the user area 302. In one embodiment, the user may be required to reboot the host system 50. In another embodiment, the user merely presents the new password for access to the user area 302 of the storage device.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of accessing a storage device by a host device, wherein the storage device comprises at least one disk drive, and wherein the at least one disk drive comprises a user data area and a reserved area, said method comprising:
   receiving a request for access to the user data area of the at least one disk drive, the user data area being encrypted;
   mapping, through a translation module of the storage device, a logical device to the reserved area of the at least one disk drive, the logical device emulating another storage device;
   routing the request to the logical device;
   providing, to the host device, executable program code for receiving authentication information for access to the user data area, the executable program code stored on the reserved area, accessible by the host device through the logical device and executable by the host device; and
   allowing access to the user data area based on the authentication information.

2. The method of claim 1, wherein receiving the request for access to the user data area comprises receiving a serial ATA request that has been translated from a SCSI request.

3. The method of claim 1, further comprising protecting the user data area of the at least one disk drive based on a password.

4. The method of claim 1, further comprising protecting the user data area of the at least one disk drive based on an ATA password.

5. The method of claim 1, further comprising protecting the user data area of the at least one disk drive based on encrypting the user data area.

6. The method of claim 1, further comprising protecting the user data of the at least one disk drive based on encrypting the user data area with an encryption engine in a controller of the at least one disk drive.

7. The method of claim 1, wherein receiving the request for access to the reserved area comprises receiving a request to an area of the at least one disk drive that is not addressable by the host device.

8. The method of claim 1, wherein receiving the request for access to the reserved area comprises receiving an ATA log request.

9. The method of claim 1, wherein receiving the request for access to the reserved area comprises receiving a request configured in a proprietary format.

10. A storage device configured to provide access by a host device to at least a secured portion of the storage device, said storage device comprising:
    an interface configured for communications with a host device;
    at least one storage medium comprising a reserved area and a user data area the user data area being encrypted;
    a bridge circuit, coupled to the interface, configured to present the reserved area as a first logical unit and the user data area as a second logical unit; and
    a controller, coupled to the bridge circuit, configured to process requests from the bridge circuit and provide access to the at least one storage medium, the controller comprising a translation module configured to map the first logical unit to the reserved area and provide program code from the reserved area to the host device for receiving authentication information and access the user data area via the second logical unit based on the authentication information, the program code executable by the host device.

11. The storage device of claim 10, wherein the at least one storage medium comprises a user data area that is addressable based on logical block addresses provided from the host device.

12. The storage device of claim 10, wherein the at least one storage medium comprises a user data area that is encrypted.

13. The storage device of claim 12, wherein the controller comprises an encryption engine for encrypting the user data area of the at least one storage medium.

14. The storage device of claim 10, wherein the bridge circuit is configured to present the first logical unit as a read-only device providing program code executable on the host device for receiving an ATA password.

15. The storage device of claim 10, wherein the bridge circuit is configured to present the first logical unit as a virtual CD device.

16. The storage device of claim 10, wherein the interface is configured to receive SCSI communications from the host device.

17. The storage device of claim 16, wherein the bridge circuit is configured to translate the SCSI communications from the host device into SATA commands for the second logical unit.

18. The storage device of claim 16, wherein the bridge circuit is configured to translate the SCSI communications from the host device into ATA Log commands for the first logical unit.

19. The storage device of claim 16, wherein the bridge circuit is configured to translate the SCSI communications from the host device into proprietary commands for the first logical unit, wherein the commands are unique based on the bridge circuit.

20. A method of recovering access to a storage device by a host device, wherein the storage device comprises at least one disk drive, and wherein the at least one disk drive comprises a user data area and a reserved area, said method comprising:
    receiving a request for access to the user data area of the at least one disk drive, the user data area being encrypted;
    determining when an authentication attempt by a host device has failed for access to the user data area of the at least one disk drive;

receiving a request for access to the reserved area of the at least one disk drive;

presenting, through a translation module of the storage device, the reserved area of the at least one disk drive as a logical device that is independent of the user data area; and providing, from the reserved area to the host device, executable program code for recovering access to the user data area, the executable program code executable by the host device.

* * * * *